(No Model.)
W. M. THOMAS.
CIRCUIT FOR SYSTEMS OF ELECTRIC LIGHTING.
No. 312,589. Patented Feb. 17, 1885.
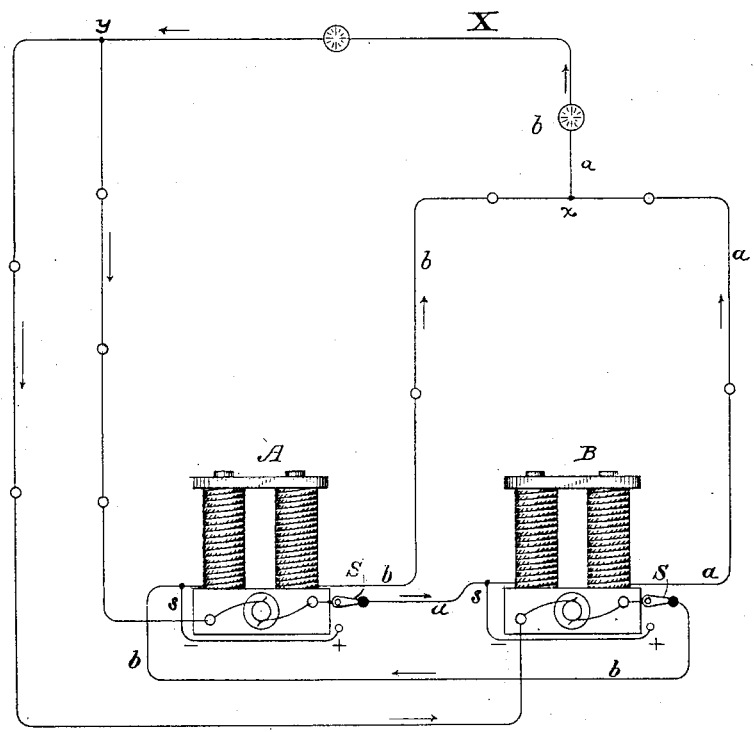
WITNESSES
Wm A. Skinkle
Al. C. Newman.
INVENTOR
William M. Thomas.
By his Attorneys
Baldwin, Hopkins, & Peyton.

UNITED STATES PATENT OFFICE.

WILLIAM M. THOMAS, OF GRAND RAPIDS, MICHIGAN, ASSIGNOR OF ONE-HALF TO THE GRAND RAPIDS ELECTRIC LIGHT AND POWER COMPANY, OF SAME PLACE.

CIRCUIT FOR SYSTEMS OF ELECTRIC LIGHTING.

SPECIFICATION forming part of Letters Patent No. 312,589, dated February 17, 1885.

Application filed April 11, 1884. (No model.)

*To all whom it may concern:*

Be it known that I, WILLIAM M. THOMAS, of Grand Rapids, in the county of Kent and State of Michigan, have invented an Improved System of Circuits for Electric Lights and other Appliances, of which the following is a specification.

My invention is specially designed for electric lighting, although it may obviously be used in connection with other appliances than electric lamps.

In an ordinary electric-lamp circuit it is often desirable to burn lamps of larger candle-power at some points in the circuit than at others. This may be the case at remote points in the circuit, where it may be desired to burn a few lamps of increased candle-power in preference to a greater number of smaller lamps, or at any special point in the circuit.

The object of my invention is to provide an improved organization by which this can be done practically and successfully.

The accompanying drawing is a diagram view illustrating my invention.

I have shown two electric generators, A B. The circuit of the first is indicated by the letter *a*, and of the latter by the letter *b*. Under the organization in this figure it will be perceived that the circuit of each machine, which may readily be traced by means of its letter of designation, runs from the positive brush through the field-magnets of the other machine, then to the point *x* in the circuit, where the lines unite on a common line, X. At any suitable point—say *y*—the circuits again divide and run to the respective opposite or — brushes of the machine. It will be perceived at once that in that part of the circuit which is common to both generators—namely, that part of the line lettered X—the current will be the combined current of the two circuits, and that therefore in that part of the circuit electric lamps of largely-increased candle-power may be burned. In all other portions of the circuit smaller electric lamps are located, as indicated in the drawing.

In the drawing I have shown each machine provided with an ordinary supplemental self-exciting branch circuit, *s*, having a suitable switch, S, by which it could be opened and closed. With the switches closed, as shown, the currents will be in the directions of the arrows, and one machine will be excited by the other. When the switch of either machine is put over to the other contact, the exciting-circuit through the field-coils of the other machine will be opened and the latter will cease to generate. At the same time the branch *s* at the machine where the switch is moved will be closed from the + brush through the field-coils, and the machine, becoming self-exciting, is no longer dependent on the other generator.

No claim is made to two or more generators connected so that at one or more points their circuits will be common to a single conductor, as such subject-matter is old.

I claim as my invention—

1. The combination, substantially as set forth, of two electric generators, the independent circuit for each generator so arranged that the circuit of one generator traverses the field-magnet coils of the other, and a conductor common to the circuits of both the generators.

2. The combination, substantially as set forth, of two electric generators, their independent circuits so arranged that the circuit of one generator normally traverses the field-magnet coils of the other, a conductor common to both circuits, and a local branch circuit and switch for each machine, by which it may be connected for self-excitation should the other machine fail to act.

In testimony whereof I have hereunto subscribed my name.

WILLIAM M. THOMAS.

Witnesses:
WM. H. POWERS,
WILLIAM E. COX.